United States Patent Office 2,775,565
Patented Dec. 25, 1956

2,775,565

COATING COMPOSITION STABILIZED WITH A CYANOETHYLATED PROTEIN

Leonard L. McKinney, John C. Cowan, and Cyril D. Evans, Peoria, Ill., assignors to the United States of America as represented by the Secretary of Agriculture No Drawing. Application March 28, 1952,
Serial No. 279,202

1 Claim. (Cl. 260—8)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a coating composition comprising an emulsion which contains cyanoethylated protein as an emulsion stabilizer.

Proteins and various modified proteins have heretofore been commonly employed to stabilize a wide variety of emulsions. These have included water emulsion paints, wax emulsions, printing pastes, paper coating emulsions, leather dressings, agricultural spray emulsions, asphalt emulsions, polish emulsions, and emulsions used in the textile industry. In general, these emulsions may be described as an emulsifiable substance, such as latex, wax, a natural or synthetic resin, a glyceride or hydrocarbon oil, asphalt or an organic or inorganic substance emulsified or suspended in fine particle or colloidal size in a continuous aqueous phase. Emulsions of the foregoing type commonly require special treatment to preserve the stability of the emulsion, since many of them tend to resolve of themselves, especially when exposed to extremes of temperature or prolonged standing. Proteins have found wide use for this purpose, and in many instances are the only substances that have been found practical to preserve a reasonable degree of stability.

The presence of proteins or modified proteins in emulsions of the foregoing type imparts to those emulsions an undesirable susceptibility to attack by microorganisms. Hence, although proteins have proved to be excellent stabilizers for emulsions, the art has experienced considerable difficulty with the tendency of proteins to deteriorate and thus become uneffective as emulsion stabilizers. Microorganisms frequently attack and destroy the protein, while stored in the containers, and as a result, the inherent instability of the emulsion redevelops. The same effect is encountered when natural enzymes that are associated with many proteins cause them to disintegrate. Coatings made from such emulsions are subject to rot and mildew because of various biological factors which disintegrate the protein content of the coating or induce the growth and spread of microorganisms.

It is customary to add preservatives to emulsions containing protein substances to inhibit the attack of microorganisms, but heretofore, attempts to preserve these compositions have not provided satisfactory results. Many effective preservatives present a health-hazard; others are only partially effective unless used in excessive amounts. Moreover, aldehydes, such as formaldehyde which are among the most effective preservatives, react with proteins to produce a cross-linked polymer, resulting in gelation, and are thus not tolerated in such emulsions.

According to the present invention, cyanoethylated protein is substituted for the protein of the prior art to stabilize coating compositions comprising emulsions containing butadiene-styrene latex as the vehicle. The invention is based in part upon our discovery that cyanoethylated protein is remarkably resistant to enzymic deterioration and to microbial attack.

The cyanoethylated protein is obtained by reacting proteins under alkaline conditions with acrylonitrile. Methods for producing it are described in Patent No. 2,594,293.

As disclosed in the patent previously acknowledged, proteins that have been modified by reaction with the acrylonitrile readily form dispersions that are stable in the presence of considerable quantities of aldehydes, like formaldehyde. For example, if formaldehyde is added to alkaline dispersions containing a moderate concentration of cyanoethylated protein, no gel is formed, even after long standing. In contrast, when formaldehyde is added to similar dispersions of unreacted proteins gelation is practically immediate.

This characteristic of cyanoethylated protein permits the addition of formaldehyde to emulsions containing the products as stabilizers; thus affording several unique advantages. For example, attack by microorganisms may be inhibited, even under drastic conditions of exposure, by utilization of the inherent property of the cyanoethylated protein itself in combination with the preservative effect of aldehydes. A variety of novel emulsion compositions which contain formaldehyde or other aldehyde condensation products or combinations of aldehyde and components that will condense with it may be produced, as for example, emulsion compositions containing A stage phenol-formaldehyde condensation products. These products may be formed separately and added to the emulsions without the risk of affecting the protein derivative present. They may also be formed in situ. The formaldehyde condensation products are not limited to the specific use of phenol as the phenolic reactant, for any of the phenolic components commonly employed to condense with formaldehyde as, for example, the cresols, the halogenated phenols, and the like may be employed.

The amount of cyanoethylated protein which is employed as the emulsion stabilizer is practically equivalent to the amount of unmodified protein which would otherwise be required. Generally, one to ten percent is sufficient, based on the solids content of the emulsion. It may be added as such, i. e. in isolated form, or it may be added in the form of a dispersion.

The quantity of aldehyde which may be added to the emulsion may vary from a minor amount up to as much as forty percent or more. However, the amount customarily used to accomplish preservation against severe conditions of exposure are usually within the range of five percent or less, based on the amount of the protein present. Likewise, the quantity of aldehyde condensates may vary within wide limits, as for example, up to forty percent or more.

It is preferred to maintain the pH of our emulsions in the range above six. If the acidity is excessive, there is a tendency for the cyanoethylated protein to coagulate.

In the examples which follow, the isolated cyanoethylated protein is employed to prepare dispersions used to stabilize emulsions. It is to be understood, however, that the isolation step is not necessary because the reaction product of acrylonitrile and an alkaline dispersion of protein may be used directly and as such. This latter feature is illustrated in Example 5, where the dispersion of cyanoethylated protein occurring in the reaction mixture may be used to stabilize emulsions. It is preferable to remove unreacted acrylonitrile in order to minimize the heath-hazard associated with free acrylonitrile. Ammonium hydroxide may be used for this purpose. When formaldehyde is employed as an ingredient in the final emulsion, the use of ammonia has the further advantage of forming hexamethylenetetramine which effectively eliminates vapors of free formaldehyde.

Although formaldehyde is specified in the examples given below, it is to be understood that a formaldehyde-yielding compound may be used instead, for example, trioxane, trimethylolnitromethane, hexamethylenetetramine, or paraformaldehyde.

*Example 1*

The resistance of cyanoethylated soybean protein to putrefaction was determined on three samples obtained by reacting soybean protein with acrylonitrile. A control of unreacted soybean protein was included for comparative purposes. The cyanoethyl content of the samples were as follows:

| Sample | Percent [—$CH_2$—$CH_2$—CN] |
|---|---|
| Soybean protein | None |
| A | 1.66 |
| B | 3.86 |
| C | 5.36 |

Two grams of each sample was dispersed in 20 cc. of aqueous alkali, placed in open test tubes at room temperature, and inoculated from a sample of putrified soybean protein.

The control sample was putrid after standing 24 hours and was so badly decomposed that it was discarded at the end of the second day. The three cyanoethylated samples remained in a preserved state throughout the 24 days of observation. Since the test tubes were left open, the samples were subjected not only to the inoculant, but also to spontaneous contamination from the air.

Similar results were obtained when the isoelectric (pH 4.0 to 4.5) samples were kept moist in an open petri dish, exposed to the air at room temperature for 18 days. In this experiment, the control sample of soybean protein supported the growth of mold while the cyanoethylated samples remained free of mold growth.

*Example 2*

Three samples of latex emulsion paints, in which only the protein was varied, were prepared as follows.

Pigments:
    31.6 g. titanium dioxide (du Pont R 300)
    7.7 g. lithopone (Panolith LRW)
    3.2 g. celite (No. 110)

These pigments were mixed thoroughly with 20 cc. of water.

Emulsion stabilizer:
    15.0 g. protein (see below [1])
    83.5 cc. distilled water
    1.5 cc. 28% $NH_3$ 10 cc. of this dispersion was added to the wet pigment mixture and stirred slowly for 15 minutes.

Vehicle:
    10 drops of antifoam mixture consisting of 2 parts D. C. silicone emulsion XE–34 and 8 parts pine oil
    1.3 g. 50% ethanolic monoethanolamine
    1.1 g. tributylphosphate
    0.7 g. polyglycol P–400 (Dow)
    51.1 g. butadiene-styrene latex emulsion, 48% solids (Dow 512K)

The mixture of the first 4 ingredients of the vehicle was stirred into the pigment-protein mixture followed by the latex emulsion.

After stirring slowly for ½ hour, the paint was allowed to stand overnight and tested for brushability. The samples were then set aside in screw-cap bottles for one year at which time they were examined for stability.

---

[1] Sample No. 1 = soybean protein; sample No. 2 = muriatic acid casein; sample No. 3 = cyanoethylated soybean protein.

Whereas samples Nos. 1 and 2 showed particles of coagulated latex and settling out of pigment, sample No. 3 had maintained its original texture.

Larger samples of similar formulations containing cyanoethylated soybean protein and cyanoethylated casein and compounded on paint rolls have stood up for two years of storage and are still in excellent condition. Samples formulated with untreated protein have been observed to deteriorate within one year of storage—in such cases the latex was coagulated into a plastic mass.

*Example 3*

An emulsion stabilizer solution was prepared as follows:

1.5 g. cyanoethylated casein (—$CH_2$—$CH_2$—CN content, 14.6%)
11 cc. distilled water
0.6 cc. of 10% sodium hydroxide (4% alkali on protein wt.)
1.0 cc. formalin (40% HCHO)

A clear viscous dispersion was obtained which was stable toward gelation and microbial action. This dispersion is useful as an emulsion stabilizer in industrial type emulsions where the presence of a small amount of formaldehyde can be tolerated.

*Example 4*

An emulsion stabilizer solution was prepared as follows:

10 g. cyanoethylated soybean protein
100 cc. distilled water
3 cc. of 10% sodium hydroxide
0.5 cc. formalin (40% HCHO)
1.0 g. phenol in 5 cc. ethanol This mixture was heated at 50° C. for ½ hour in order to effect a condensation between formaldehyde and phenol. pH of dispersion was 9.4.

This dispersion was stable to gelation and microbial growth as determined by standing in the laboratory. It is useful as an emulsion stabilizer for industrial preparation where a small amount of phenol and formaldehyde can be tolerated.

An equally stable dispersion was obtained when sodium 2,4,5-trichlorophenolate was substituted for the phenol. In this case, advantage is taken of the superior preservative properties of the chlorinated phenols.

*Example 5*

An emulsion stabilizer solution was prepared as follows:

25 g. muriatic acid casein
240 cc. distilled water
10 cc. of 10% sodium hydroxide solution
15 cc. acrylonitrile The pH at the beginning of the reaction was 9.0.

After standing overnight (17 hrs.) at room temperature, the pH was 7.0 as a result of cyanoethylation of basic groups.

This neutral dispersion is useful as an emulsion stabilizer with or without the addition of formaldehyde. Ammonium hydroxide may be added to react with any unreacted acrylonitrile. If formaldehyde is added it reacts with ammonia to produce hexamethylenetetramine which acts as a preservative.

We claim:

A coating composition comprising butadiene-styrene latex as the vehicle emulsified in a continuous aqueous system containing as an emulsion stabilizer, a stabilizing amount of cyanoethylated protein, said composition being in a stable and preserved condition in that its storage life—the period during which it maintains its original condition without gelation, without separation of the emulsifiable substance, and without spoilage of the emulsion stabilizer—is at least twice that of a composition formed of the same emulsifiable substance emulsified in a continuous aqueous system containing as an emulsion stabilizer, the same protein but free from cyanoethyl groups.

References Cited in the file of this patent

UNITED STATES PATENTS

| | | |
|---|---|---|
| 2,186,369 | Dike | Jan. 9, 1940 |
| 2,368,660 | Hochstetter | Feb. 6, 1945 |
| 2,373,401 | King | Apr. 10, 1945 |
| 2,436,328 | Porter | Feb. 17, 1948 |
| 2,481,838 | Glasgow | Sept. 13, 1949 |
| 2,511,113 | La Prana | June 13, 1950 |
| 2,548,520 | Damschroeder et al. | Apr. 10, 1951 |
| 2,562,534 | Coffman | July 31, 1951 |
| 2,594,293 | Cowan et al. | Apr. 29, 1952 |